(12) United States Patent
Masuda et al.

(10) Patent No.: US 12,223,227 B2
(45) Date of Patent: Feb. 11, 2025

(54) VOICE GUIDANCE METHOD

(71) Applicant: TOYOTA JIDOSHA KABUSHIKI KAISHA, Toyota (JP)

(72) Inventors: Taizo Masuda, Yokohama (JP); Ryota Tomizawa, Mishima (JP); Sei Miyazaki, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/989,923

(22) Filed: Nov. 18, 2022

(65) Prior Publication Data
US 2023/0251824 A1    Aug. 10, 2023

(30) Foreign Application Priority Data
Feb. 10, 2022    (JP) .................................. 2022-019479

(51) Int. Cl.
*G06F 3/16*    (2006.01)
*G08B 3/00*    (2006.01)

(52) U.S. Cl.
CPC ............... *G06F 3/167* (2013.01); *G08B 3/00* (2013.01)

(58) Field of Classification Search
CPC .. G06F 3/167; G08B 3/00; G08B 3/10; G08B 1/08
See application file for complete search history.

(56) References Cited

U.S. PATENT DOCUMENTS

| | | | |
|---|---|---|---|
| 2019/0128694 A1 | 5/2019 | Matsushita et al. | |
| 2023/0067615 A1* | 3/2023 | Bond | G06V 10/768 |

FOREIGN PATENT DOCUMENTS

| | | | |
|---|---|---|---|
| CN | 214492712 U | | 10/2021 |
| JP | 2005-345293 A | | 12/2005 |
| JP | 2012014730 A | * | 1/2012 |
| JP | 2018-119837 A | | 8/2018 |
| JP | 2019-078692 A | | 5/2019 |

* cited by examiner

*Primary Examiner* — Pei Yong Weng
(74) *Attorney, Agent, or Firm* — Dinsmore & Shohl LLP

(57) ABSTRACT

A voice guidance method includes: a determination step of determining whether or not a visually impaired person is included in passengers in a vehicle as a public transport; and a guidance step of, in a case where the visually impaired person is determined to be included in the passengers, providing voice guidance to inform the visually impaired person of a state around the vehicle when the visually impaired person gets off the vehicle.

3 Claims, 3 Drawing Sheets

VOICE GUIDANCE METHOD

CROSS-REFERENCE TO RELATED APPLICATION

This application claims priority to Japanese Patent Application No. 2022-019479 filed on Feb. 10, 2022, incorporated herein by reference in its entirety.

BACKGROUND

1. Technical Field

The present disclosure relates to the technical field of a voice guidance method in a vehicle.

2. Description of Related Art

As this type of method, the following method is proposed in a vehicle allocation service, for example (see Japanese Unexamined Patent Application Publication No. 2019-078692 (JP 2019-078692 A)). That is, in a case where a user is a visually impaired person, voice guidance to guide the user to an allocated self-driving vehicle is provided.

SUMMARY

The voice guidance is an important information source to support a visually impaired person to go out. On this account, it is desirable for the voice guidance to be provided for the visually impaired person in various scenes. For example, at the time of getting off a vehicle, the visually impaired person often does not have a sufficient time to grasp a surrounding environment.

The present disclosure is accomplished in view of the above circumstance, and an object of the present disclosure is to provide a voice guidance method for providing voice guidance at the time of getting off a vehicle.

A voice guidance method according to one aspect of the disclosure includes: a determination step of determining whether or not a visually impaired person is included in passengers in a vehicle as a public transport; and a guidance step of, in a case where the visually impaired person is determined to be included in the passengers, providing voice guidance to inform the visually impaired person of a state around the vehicle when the visually impaired person gets off the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a voice guidance method will be described with reference to FIGS. 1 to 5. In the embodiment described below, a route bus is taken as a public transport as an example. The voice guidance method is not limited to the route bus and is also applicable to a train, a taxi, or the like. The route bus may be an autonomous driving bus.

Figure 1:
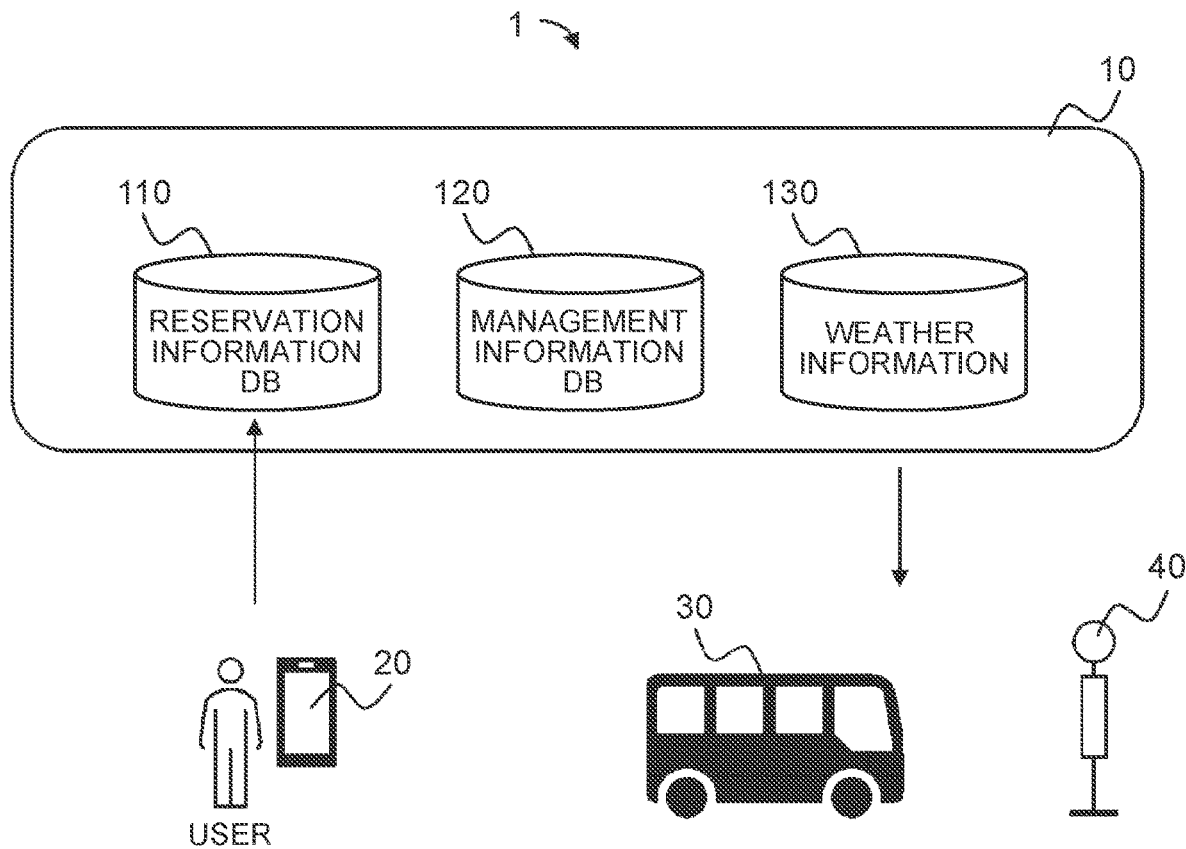
FIG. 1 is a view illustrating an outline of a voice guidance system according to an embodiment.

In FIG. 1, the voice guidance system 1 includes a server 10, a terminal device 20 possessed by a user, a bus 30, and a bus stop 40. The server 10, the terminal device 20, the bus 30, and the bus stop 40 are communicable with each other via a wide area network such as the Internet, for example. The "user" indicates a user of the route bus. The user includes a physically unimpaired person and a handicapped person. An application to use the voice guidance system 1 is installed in the terminal device 20.

In the server 10, a reservation information database 110 (hereinafter referred to as a "reservation information DB 110"), a management information database 120 (hereinafter referred to as a "management information DB 120"), and weather information 130 are stored.

The reservation information DB 110 includes reservation information input by the user via the terminal device 20. The reservation information includes, for example, vehicle information (e.g., a bus number) to specify a bus that the user takes, a getting-on position (e.g., a bus stop name) and a getting-on scheduled time at which the user gets on the bus, a getting-off position (e.g., a bus stop name) and a getting-off scheduled time at which the user gets off the bus, and so on. The reservation information is associated with user information to specify the user. The user information may include, for example, a full name, contact information (a telephone number, e-mail address, address, and the like), sex, age, information indicative of settlement method, and so on. In the present embodiment, the user information particularly includes information indicative of whether the user is a visually impaired person or not.

Note that an identification number may be assigned to the user information. The user information may be stored in a user information database (not illustrated), for example, together with the assigned identification number. In this case, the reservation information may be associated with the identification number assigned to the user information, instead of the user information.

The management information DB 120 includes information to operate the bus. The information to operate the bus may include, for example, identification information on the bus, identification information on a bus stop, route information, an operation plan, a timetable at each bus stop, and so on. The weather information 130 may include future weather information (that is, weather forecast information) in addition to current weather information. Note that the server 10 may acquire the weather information 130 from a company that provides weather information, for example.

The following describes an outline of the operation of the voice guidance system 1. The server 10 determines whether a user is a visually impaired person or not, based on user information associated with reservation information (that is, reservation information input by the user via the terminal device 20) included in the reservation information DB 110. In a case where the server 10 determines that the user is a visually impaired person, the server 10 specifies a bus that the user takes and a bus stop where the user is to get off the bus, based on reservation information on the user and the management information DB 120. Herein, the bus that the user takes is the bus 30, and the bus stop at which the user is to get off the bus is the bus stop 40.

The server 10 transmits, to the bus 30, information indicating that the user as the visually impaired person takes the bus 30 and information indicative of the bus stop 40 where the user is to get off the bus 30, for example. Further, the server 10 also transmits, to the bus stop 40, information indicating that the user as the visually impaired person is to get off the bus 30 at the bus stop 40, and information indicative at least either one of a getting-off scheduled time included in the reservation information on the user and the time of arrival of the bus 30 at the bus stop 40 based on the management information DB 120, for example. Note that, in a case where the bus stop 40 is configured to recognize an approach of the bus 30 to the bus stop 40, the server 10 may transmit, to the bus stop 40, information to specify the bus 30 instead of or in addition to the information indicative of at least either one of the getting-off scheduled time and the time of arrival.

The server 10 transmits, based on the weather information 130, area-specific weather information (so-called mesh weather information) indicative of the weather in an area including the bus stop 40 to at least either one of the bus 30 and the bus stop 40. Note that the area-specific weather information may be information observed in real time or may be information predicted in advance (that is, weather forecast).

When the bus 30 arrives at the bus stop 40, the bus 30 detects obstacles around the bus 30 and the bus stop 40. When the bus 30 arrives at the bus stop 40, the bus stop 40 detects obstacles around the bus 30 and the bus stop 40. The "obstacle" is a concept that is not limited to an object but also includes a human such as a pedestrian, for example. The bus 30 and the bus stop 40 extract a movable body that is a moving obstacle from among the detected obstacles. The bus 30 and the bus stop 40 particularly extract a movable body (that is, a movable body that may make contact with or collide with the user as the visually impaired person who gets off the bus 30) that is coming close to the bus 30. Further, the bus stop 40 estimates a degree of crowdedness on a sidewalk around the bus stop 40 from the number of people present on the sidewalk.

Note that, as a detection method for detecting obstacles, an existing method using a sensor such as a camera or a radar may be employed, for example. As a detection method for detecting a movable body, an existing method such as a method for detecting a movable body based on a change in the position of a detected obstacle over time may be employed, for example. The degree of crowdedness on the sidewalk may be estimated as follows, for example. That is, the bus stop 40 is communicable by a predetermined communications standard such as Bluetooth (registered trademark), for example. The bus stop 40 detects the number of terminal devices (e.g., smartphones or the like) possessed by people around the bus stop 40 and corresponding to the predetermined communications standard. The bus stop 40 may estimate the degree of crowdedness on the sidewalk based on the number of the terminal devices thus detected.

When the bus 30 arrives at the bus stop 40, at least either one of the bus 30 and the bus stop 40 provides information indicative of the extracted movable body or information indicative the estimated degree of crowdedness on the sidewalk. At least either one of the bus 30 and the bus stop 40 further provides the area-specific weather information transmitted from the server 10.

Figure 2:
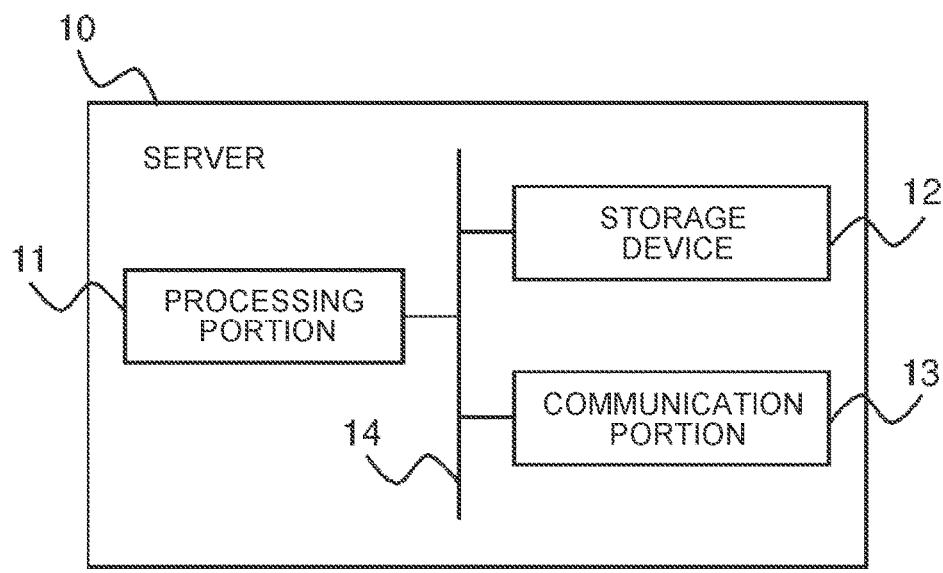
FIG. 2 is a block diagram illustrating a configuration of a server according to the embodiment.

The server 10 will be described with reference to FIG. 2. In FIG. 2, the server 10 includes a processing portion 11, a storage device 12, and a communication portion 13. The processing portion 11, the storage device 12, and the communication portion 13 are connected to each other via a bus 14. The reservation information DB 110, the management information DB 120, and the weather information 130 may be built in the storage device 12.

The processing portion 11 determines whether a user is a visually impaired person or not, based on user information associated with reservation information included in the reservation information DB 110. In a case where the processing portion 11 determines that the user is a visually impaired person, the processing portion 11 performs the following operation.

That is, the processing portion 11 specifies the bus 30 that the user takes and the bus stop 40 where the user is to get off the bus 30, based on the reservation information on the user and the management information DB 120. The processing portion 11 transmits, to the bus 30 via the communication portion 13, information indicating that the user as the visually impaired person takes the bus 30 and information indicative of the bus stop 40 where the user is to get off the bus 30, for example. The processing portion 11 also transmits, to the bus stop 40 via the communication portion 13, information indicating that the user as the visually impaired person is to get off the bus 30 at the bus stop 40, information indicative of at least either of a getting-off scheduled time included in the reservation information on the user and the time of arrival of the bus 30 at the bus stop 40 based on the management information DB 120. The processing portion 11 transmits area-specific weather information on an area including the bus stop 40 to at least either one of the bus 30 and the bus stop 40.

Figure 3:
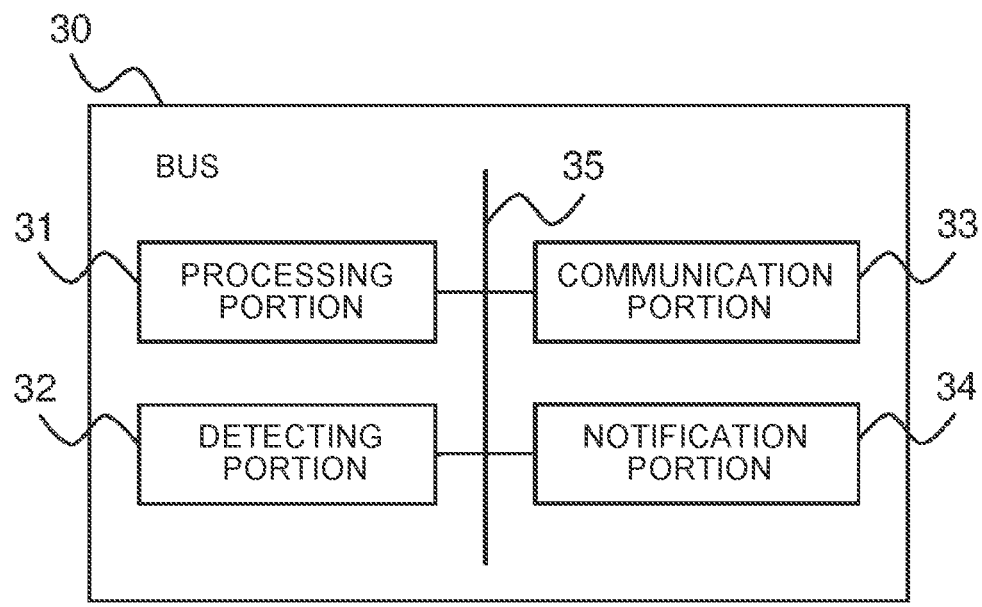
FIG. 3 is a block diagram illustrating a configuration of a bus according to the embodiment.

The bus 30 will be described with reference to FIG. 3. In FIG. 3, the bus 30 includes a processing portion 31, a detecting portion 32, a communication portion 33, and a notification portion 34. The processing portion 31, the detecting portion 32, the communication portion 33, and the notification portion 34 are connected to each other via a bus 35. The detecting portion 32 detects obstacles around the bus 30 based on an output from a sensor such as a camera or a radar, for example. At the time of a system operation of the bus 30, the detecting portion 32 may always detect obstacles around the bus 30. The notification portion 34 outputs voice inside the bus 30 and outside the bus 30 through a speaker (not illustrated) provided in the bus 30.

In a case where the processing portion 31 receives, from the server 10 via the communication portion 33, information indicating that the user as the visually impaired person is in the bus 30, when the bus 30 arrives at the vicinity of the bus stop 40 where the user is to get off the bus 30, the processing portion 31 acquires an obstacle detection result from the detecting portion 32. The processing portion 31 extracts information indicative of a movable body coming close to the bus 30 from the acquired obstacle detection result. The processing portion 31 generates warning voice to call attention to the movable body indicated by the extracted information. Note that, in a case where information indicative of a plurality of movable bodies is extracted from the obstacle detection result, the processing portion 31 may generate warning voice to call attention only to a movable body coming close to an exit of the bus 30. In a case where information indicative of a movable body coming close to the bus 30 is not extracted from the obstacle detection result, the processing portion 31 may not generate the warning voice.

The processing portion 31 controls the notification portion 34 such that the notification portion 34 outputs the warning voice. The processing portion 31 controls the notification portion 34 such that the notification portion 34 outputs voice corresponding to area-specific weather information with the proviso that the processing portion 31 receives the area-specific weather information from server 10 via the communication portion 33. Note that the processing portion 31 may control the notification portion 34 such that the notification portion 34 outputs voice to call attention to steps inside the bus 30, for example. Further, the processing portion 31 may control the notification portion 34 such that the notification portion 34 outputs voice that provides guidance on equipment that assists the visually impaired person to walk, the equipment being a hand rail or the like provided inside the bus 30, for example.

Figure 4:
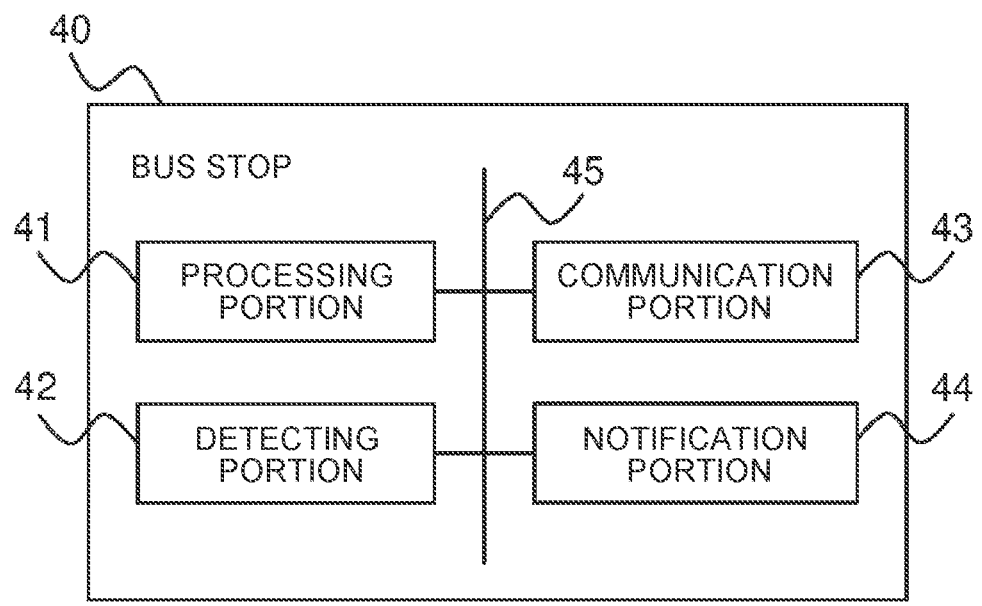
FIG. 4 is a block diagram illustrating a configuration of a bus stop according to the embodiment.

The bus stop 40 will be described more with reference to FIG. 4. In FIG. 4, the bus stop 40 includes a processing portion 41, a detecting portion 42, a communication portion 43, and a notification portion 44. The processing portion 41, the detecting portion 42, the communication portion 43, and the notification portion 44 are connected to each other via a bus 45. The detecting portion 42 detects an obstacle around the bus stop 40 based on an output from a sensor such as a camera or a radar, for example. The notification portion 44 outputs voice through a speaker (not illustrated) provided in the bus stop 40. Note that the sensor or the speaker may be placed on a guidance display board, a shed (that is, a roof structural body), or the like of the bus stop 40, for example.

In a case where the processing portion 41 receives, from the server 10 via the communication portion 43, information indicating that the user as the visually impaired person is to get off the bus 30 at the bus stop 40, the processing portion 41 estimates a degree of crowdedness on a sidewalk around the bus stop 40 a predetermined time before at least either one of the getting-off scheduled time of the user and the time of arrival of the bus 30 at the bus stop 40. The processing portion 41 controls the notification portion 44 such that the notification portion 44 outputs voice corresponding to information indicative of the estimated degree of crowdedness on the sidewalk based on the at least either one of the getting-off scheduled time and the time of arrival (that is, when the bus 30 arrives at the bus stop 40). Note that, in a case where processing portion 41 can specify the bus 30, the processing portion 41 may transmit information indicative of the estimated degree of crowdedness on the sidewalk to the bus 30 directly or via the server 10. In this case, the processing portion 31 of the bus 30 may control the notification portion 34 such that the notification portion 34 outputs voice corresponding to the information indicative of the degree of crowdedness on the sidewalk at the time when the bus 30 arrives at the bus stop 40.

In a case where the processing portion 41 receives, from the server 10 via the communication portion 43, information indicating that the user as the visually impaired person is to get off the bus 30 at the bus stop 40, the processing portion 41 acquires an obstacle detection result from the detecting portion 42 in at least either one of the getting-off scheduled time and the time of arrival. The processing portion 41 extracts information indicative of a movable body coming close to the bus 30 from the acquired obstacle detection result. The processing portion 41 generates warning voice to call attention to the movable body indicated by the extracted information. Note that, in a case where information indicative of a plurality of movable bodies is extracted from the obstacle detection result, the processing portion 41 may generate warning voice to call attention only to a movable body coming close to the exit of the bus 30.

The processing portion 41 controls the notification portion 44 such that the notification portion 44 outputs the warning voice. The processing portion 41 controls the notification portion 44 such that the notification portion 44 outputs voice corresponding to area-specific weather information with the proviso that the processing portion 41 receives the area-specific weather information from server 10 via the communication portion 43.

Figure 5:
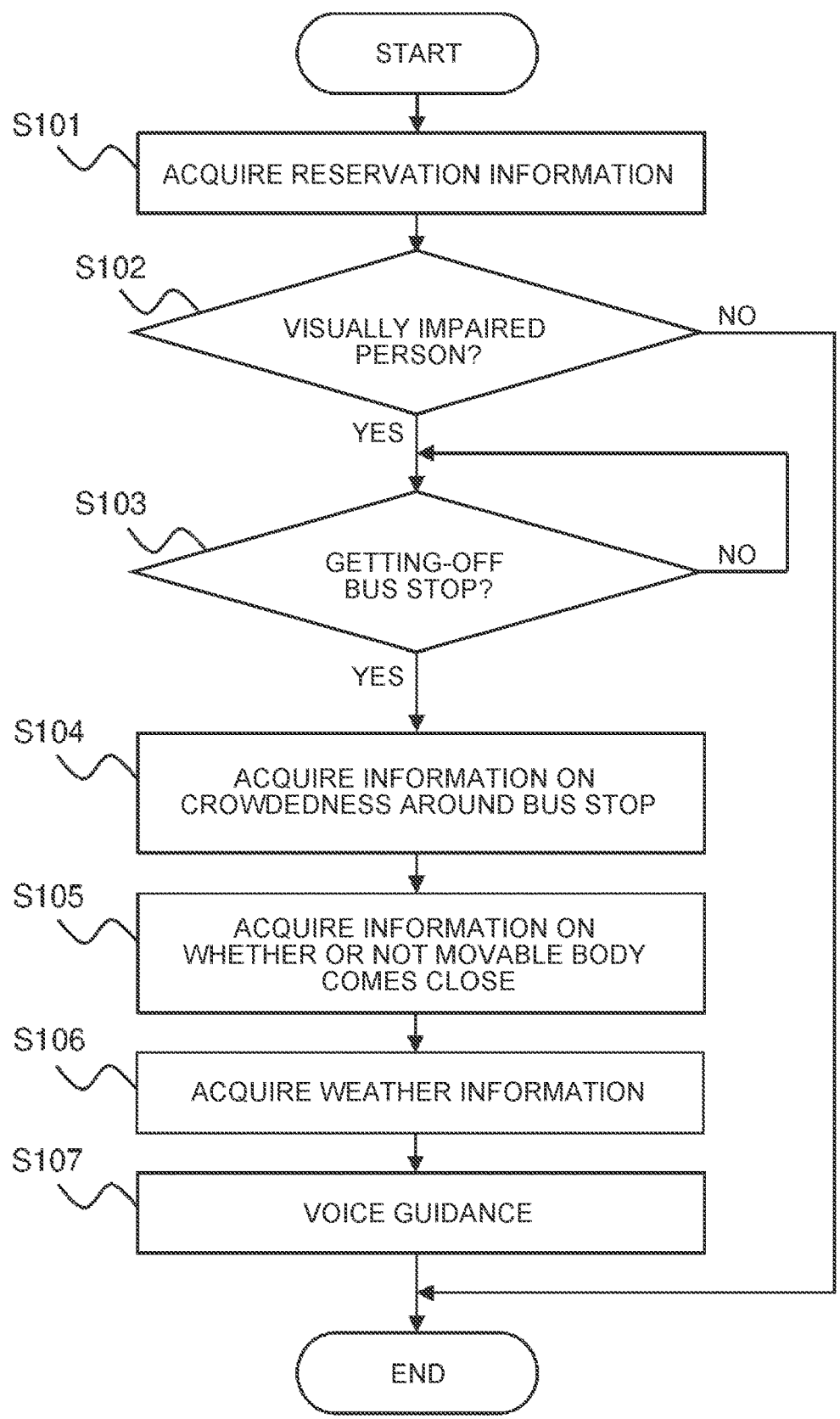
FIG. 5 is a flowchart illustrating the operation of a voice guidance system according to the embodiment.

Next will be described the operation of the voice guidance system 1 with reference to the flowchart of FIG. 5. In FIG. 5, the processing portion 11 of the server 10 determines whether a user is a visually impaired person or not, based on user information associated reservation information included in the reservation information DB 110 (step S101).

In the process of step S102, in a case where the processing portion 11 determines that the user is not a visually impaired person (step S102: No), the operation illustrated in FIG. 5 is ended. After that, the process of step S101 is performed for another user. That is, in a bus without any visually impaired person, the voice guidance is not provided.

In the process of step S102, in a case where the processing portion 11 determines that the user is a visually impaired person (step S102: Yes), the processing portion 11 specifies the bus 30 that the user as the visually impaired person takes and the bus stop 40 where the user is to get off the bus 30. After that, the processing portion 31 of the bus 30 determines whether or not a bus stop where the bus 30 stops next is the bus stop 40 where the user as the visually impaired person is to get off the bus 30 (step S103).

In the process of step S103, in a case where the processing portion 31 determines that the bus stop where the bus 30 stops next is not the bus stop 40 (step S103: No), the process of step S103 is performed again. At this time, the processing portion 31 may control the notification portion 34 such that the notification portion 34 outputs voice to inform the user as the visually impaired person of the traveling position of the bus 30.

In the process of step S103, in a case where the processing portion 31 determines that the bus stop where the bus 30 stops next is the bus stop 40 (step S103: Yes), the processing portion 31 performs processes of step S104 and its subsequent steps described below. At this time, the processing portion 41 of the bus stop 40 performs processes of step S104 and its subsequent steps described below based on at least either one of the getting-off scheduled time of the user as the visually impaired person and the time of arrival of the bus 30 at the bus stop 40.

In the process of step S104, the processing portion 41 of the bus stop 40 estimates a degree of crowdedness on a sidewalk around the bus stop 40. In the process of step S105, the processing portion 31 of the bus 30 extracts information indicative of a movable body coming close to the bus 30 from an obstacle detection result from the detecting portion 32. In the process of step S105, the processing portion 41 of the bus stop 40 extracts information indicative of a movable body coming close to the bus 30 from an obstacle detection result from the detecting portion 42. In the process of step S106, at least either one of the processing portion 31 of the bus 30 and the processing portion 41 of the bus stop 40 acquires area-specific weather information on an area including the bus stop 40 from the server 10.

In the process of step S107, the processing portion 31 of the bus 30 controls the notification portion 34 such that the notification portion 34 outputs warning voice based on a result of the process of step S105. In a case where the processing portion 31 acquires the area-specific weather information in the process of step S106, the processing portion 31 controls the notification portion 34 such that the notification portion 34 outputs voice corresponding to the area-specific weather information. In the process of step S107, the processing portion 41 of the bus stop 40 controls the notification portion 44 such that the notification portion 44 outputs voice corresponding to information indicative of the estimated degree of crowdedness on the sidewalk that is estimated in the process of step S104. Further, the processing portion 41 controls the notification portion 44 such that the notification portion 44 outputs warning voice based on a result of the process of step S105. In a case where the processing portion 41 acquires the area-specific weather information in the process of step S106, the processing portion 41 controls the notification portion 44 such that the notification portion 44 outputs voice corresponding to the area-specific weather information. As a result, voice guidance is provided to the user as the visually impaired person.

Note that, in the process of step S107, the terminal device 20 possessed by the user as the visually impaired person may provide the above voice guidance. In this case, pieces of information indicative of the results of the processes of steps S104 and S105 may be transmitted to the terminal device 20 via the server 10. Further, the server 10 may transmit the area-specific weather information to the terminal device 20.

TECHNICAL EFFECTS

With the voice guidance system 1, when the user as the visually impaired person gets off the bus 30, it is possible to provide voice guidance about a surrounding environment (e.g., a movable body coming close to the bus 30, the degree of crowdedness on a sidewalk, area-specific weather information, and so on) around the bus stop 40. Accordingly, the visually impaired person can grasp the surrounding environment around the bus 30 and the bus stop 40 before the visually impaired person gets off the bus 30. In the voice guidance system 1, the bus stop 40 also provide voice guidance as well as the bus 30. Accordingly, it is possible to expect that the visually impaired person relatively easily hears voice of the voice guidance even after the visually impaired person gets off the bus 30. As a result, the visually impaired person can use a route bus at ease, so that it is possible to expect that the visually impaired person is promoted to use the route bus.

In the meantime, in the voice guidance system 1, in a case where no visually impaired person is in the bus 30, the voice guidance is not provided. This is because information to be provided by the voice guidance is not so important to a physically unimpaired person who can grasp the surrounding environment around the bus 30 and the bus stop 40 from visual information or the like. Accordingly, in comparison with a case where the voice guidance is provided every time the bus 30 stops at a bus stop, for example, it is possible to restrain the physically unimpaired person from feeling annoyed with the voice guidance.

Note that, even in a case where no visually impaired person is in the bus 30, when the bus 30 stops at a bus stop, for example, information indicative of the presence of a movable body coming close to bus 30 or the like may be provided. That is, the voice guidance about the surrounding environment around the bus stop may be provided by changing the content of the guidance depending on whether the visually impaired person is in the bus 30 or not.

Aspects of the disclosure that are derived from the embodiment described above will be described below.

A voice guidance method according to one aspect of the disclosure includes: a determination step of determining whether or not a visually impaired person is included in passengers in a vehicle as a public transport; and a guidance step of, in a case where the visually impaired person is determined to be included in the passengers, providing voice guidance to inform the visually impaired person of a state around the vehicle when the visually impaired person gets off the vehicle. In the above embodiment, the "bus 30" corresponds to an example of the "vehicle as the public transport."

In the voice guidance method, the state around the vehicle may include at least one of a degree of crowdedness on a sidewalk, information on a movable body coming close to the vehicle, and weather information.

In the voice guidance method, in a case where the visually impaired person is determined not to be included in the passengers, the state around the vehicle may not be provided.

The present disclosure is not limited to the embodiment described above. The present disclosure is modifiable appropriately as far as the modification is not against the gist or idea of the disclosure that can be read from claims and the whole specification. A voice guidance method based on such a modification is also within the technical scope of the present disclosure.

What is claimed is:

1. A voice guidance method comprising:
   receiving reservation information indicating whether a visually impaired person will board a vehicle as public transport and indicating where the visually impaired person will get off of the vehicle;
   determining whether or not a visually impaired person is included in passengers in the vehicle based on the reservation information;
   upon determination that the visually impaired person is included in the passengers of the vehicle, when the vehicle arrives at the location where the visually impaired person will get off of the vehicle, determine whether a movable object is coming towards the vehicle that may collide with the visually impaired person getting off of the vehicle based on sensor data; and
   upon determination that the movable object that may collide with the visually impaired person getting off of the vehicle is coming towards the vehicle, output a warning voice to call attention to the movable object.

2. The voice guidance method according to claim 1, wherein the sensor data includes at least one of a degree of crowdedness on a sidewalk, information on a movable body coming close to the vehicle, and weather information.

3. The voice guidance method according to claim 1, wherein, upon determination that the visually impaired person is not included in the passengers of the vehicle, the warning voice is not output.

* * * * *